(12) United States Patent
Yoshida et al.

(10) Patent No.: US 12,674,724 B2
(45) Date of Patent: Jul. 7, 2026

(54) VIBRATION MONITORING DEVICE, TURBOCHARGER, AND VIBRATION MONITORING METHOD

(71) Applicant: Mitsubishi Heavy Industries Marine Machinery & Equipment Co., Ltd., Nagasaki (JP)

(72) Inventors: Tadashi Yoshida, Tokyo (JP); Hidetaka Nishimura, Nagasaki (JP); Akifumi Tanaka, Nagasaki (JP); Shinji Ogawa, Tokyo (JP); Isao Tomita, Tokyo (JP); Tohru Suita, Tokyo (JP); Ryoji Sasaki, Tokyo (JP)

(73) Assignee: MITSUBISHI HEAVY INDUSTRIES MARINE MACHINERY & EQUIPMENT CO., LTD., Nagasaki (JP)

( * ) Notice: Subject to any disclaimer, the term of this patent is extended or adjusted under 35 U.S.C. 154(b) by 347 days.

(21) Appl. No.: 18/278,316

(22) PCT Filed: Feb. 15, 2022

(86) PCT No.: PCT/JP2022/005806
§ 371 (c)(1),
(2) Date: Aug. 22, 2023

(87) PCT Pub. No.: WO2022/185895
PCT Pub. Date: Sep. 9, 2022

(65) Prior Publication Data
US 2024/0118170 A1 Apr. 11, 2024

(30) Foreign Application Priority Data

Mar. 5, 2021 (JP) ................................. 2021-035140
Jul. 16, 2021 (JP) ................................. 2021-117896

(51) Int. Cl.
*G01M 15/12* (2006.01)
*G01D 5/14* (2006.01)
*G01S 17/08* (2006.01)

(52) U.S. Cl.
CPC .............. *G01M 15/12* (2013.01); *G01D 5/14* (2013.01); *G01S 17/08* (2013.01)

(58) Field of Classification Search
CPC .......... G01M 15/12; G01D 5/14; G01S 17/08
See application file for complete search history.

(56) References Cited

U.S. PATENT DOCUMENTS 4,478,082 A 10/1984 Sato et al.
5,474,813 A 12/1995 Walker et al.
(Continued)

FOREIGN PATENT DOCUMENTS

CN 106126840 B * 5/2019 ............. G06F 30/20
CN 212376895 U * 1/2021
(Continued)

OTHER PUBLICATIONS

International Search Report dated May 10, 2022, issued in counterpart Application No. PCT/JP2022/005806. (10 pages).
(Continued)

*Primary Examiner* — Jamel E Williams
(74) *Attorney, Agent, or Firm* — WHDA, LLP

(57) ABSTRACT

A vibration monitoring device includes: a rotation sensor for outputting a rotation signal synchronized with rotation of a rotational shaft; an output device for outputting a filter command value corresponding to a rotation speed of the rotational shaft calculated from the rotation signal; and at least one filter for extracting, in response to input of the rotation signal and the filter command value, a signal in a passband set according to the filter command value from the
(Continued)

rotation signal as a vibration signal from which vibration information of the rotational shaft can be obtained.

16 Claims, 13 Drawing Sheets

(56) References Cited

U.S. PATENT DOCUMENTS

| | | | |
|---|---|---|---|
| 2008/0149049 A1 | 6/2008 | Mollmann et al. | |
| 2012/0330605 A1 | 12/2012 | Whitefield, II | |
| 2020/0103894 A1 | 4/2020 | Cella et al. | |

FOREIGN PATENT DOCUMENTS

| | | | | | |
|---|---|---|---|---|---|
| DE | 102012105397 A1 | * | 1/2013 | ............... | G01D 3/10 |
| GB | 2169712 A | * | 7/1986 | ............. | G01P 3/487 |
| JP | H02-159525 A | | 6/1990 | | |
| JP | H06-26919 A | | 2/1994 | | |
| JP | H07-43207 A | | 2/1995 | | |
| JP | H11-83616 A | | 3/1999 | | |
| JP | 2001-194222 A | | 7/2001 | | |
| JP | 2008-180697 A | | 8/2008 | | |
| JP | 2011-133362 A | | 7/2011 | | |
| JP | 2013-003149 A | | 1/2013 | | |
| JP | 2013224847 A | * | 10/2013 | | |
| JP | 2019-027860 A | | 2/2019 | | |

OTHER PUBLICATIONS

Notification Concerning Transmittal of International Preliminary Report on Palatability (Forms PCT/IB/326) issued in counterpart International Application No. PCT/JP2022/005806 mailed Sep. 14, 2023 with Forms PCT/IB/373, PCT/IB/338 and PCT/ISA/237. (13 pages).

Extended (Supplementary) European Search Report dated May 17, 2024, issued in counterpart EP application No. 22762952.4. (12 pages).

* cited by examiner

TIME

VIBRATION MONITORING DEVICE, TURBOCHARGER, AND VIBRATION MONITORING METHOD

TECHNICAL FIELD

This disclosure relates to a vibration monitoring device, a turbocharger, and a vibration monitoring method.

The present application claims priority based on Japanese Patent Application No. 2021-035140 filed on Mar. 5, 2021, the entire content of which is incorporated herein by reference. Further, the present application claims priority based on Japanese Patent Application No. 2021-117896 filed on Jul. 16, 2021, the entire content of which is incorporated herein by reference.

BACKGROUND

For example, Patent Document 1 discloses a technique of outputting a rotation signal synchronized with the rotation of a compressor impeller (rotating body) and calculating the vibration of the rotating body from changes in the peak value of the output rotation signal of the rotating body.

CITATION LIST

Patent Literature

Patent Document 1: JP2013-224847A

SUMMARY

Problems to be Solved

There is a desire to monitor the vibration of a rotational shaft without installing a vibration sensor that can directly detect the vibration of the rotational shaft. However, a method for obtaining information on the vibration of a rotational shaft from a rotation signal of the rotational shaft has not been established.

The present disclosure was made in view of the above problem, and an object thereof is to provide a vibration monitoring device and a vibration monitoring method whereby it is possible to evaluate the vibration of a rotational shaft from a rotation signal of the rotational shaft.

Solution to the Problems

To accomplish the above object, a vibration monitoring device according to the present disclosure includes: a rotation sensor for outputting a rotation signal synchronized with rotation of a rotational shaft; an output device for outputting a filter command value corresponding to a rotation speed of the rotational shaft calculated from the rotation signal; and at least one filter for extracting, in response to input of the rotation signal and the filter command value, a signal in a passband set according to the filter command value from the rotation signal as a vibration signal from which vibration information of the rotational shaft can be obtained.

To accomplish the above object, a vibration monitoring method according to the present disclosure includes: a step of outputting a rotation signal synchronized with rotation of a rotational shaft; a step of outputting a filter command value corresponding to a rotation speed of the rotational shaft calculated from the rotation signal; and a step of extracting, in response to input of the rotation signal and the filter command value, a signal in a passband set according to the filter command value from the rotation signal as a vibration signal from which vibration information of the rotational shaft can be obtained.

Advantageous Effects

With the vibration monitoring device and the vibration monitoring method of the present disclosure, it is possible to evaluate the vibration of a rotational shaft from a rotation signal of the rotational shaft.

DETAILED DESCRIPTION

Hereinafter, a vibration monitoring device, a turbocharger, and a vibration monitoring method according to embodiments of the present disclosure will be described with reference to the drawings. The following embodiments are illustrative and not intended to limit the present disclosure, and various modifications are possible within the scope of technical ideas of the present disclosure.

First Embodiment (Configuration of Turbocharger)

Figure 1:
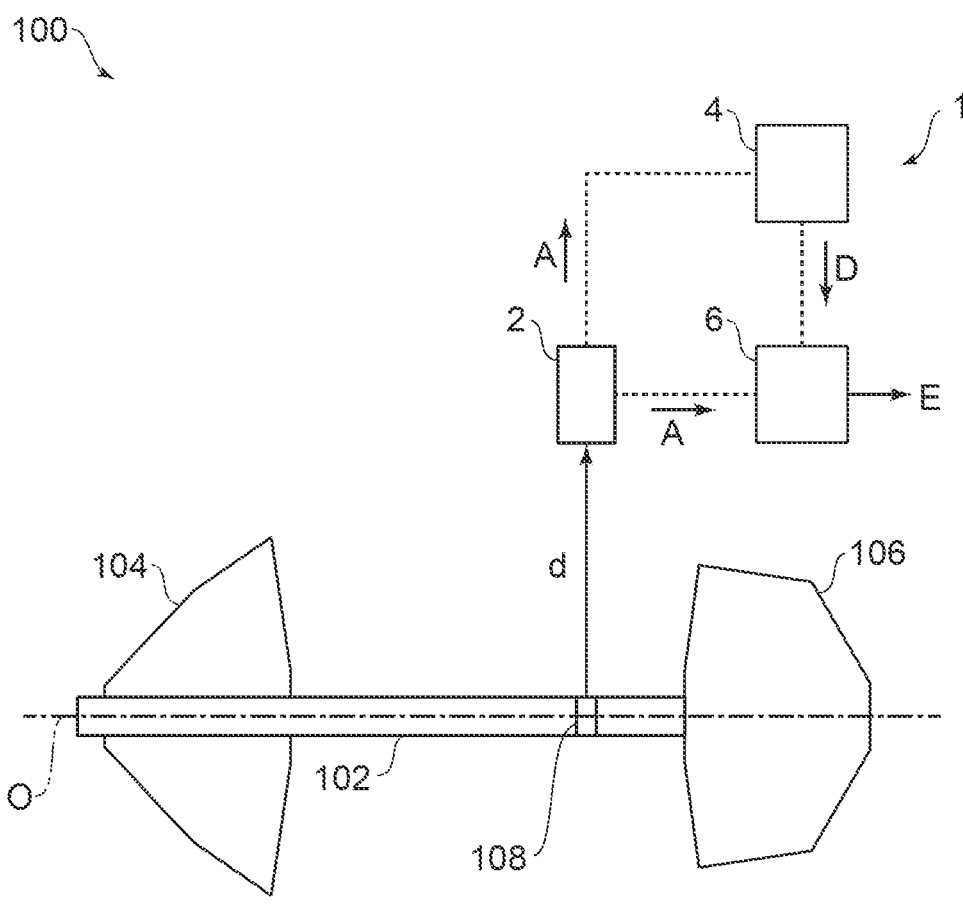
FIG. 1 is a schematic configuration diagram of a turbocharger to which a vibration monitoring device according to the first embodiment is applied.

FIG. 1 is a schematic configuration diagram of a turbo-charger 100 to which a vibration monitoring device 1 according to the first embodiment is applied. The turbo-charger 100 may be, but is not limited to, an exhaust turbocharger for supercharging air in an engine mounted on a ship, for example. In the present disclosure, the exhaust turbocharger will be described as an example.

As shown in FIG. 1, the turbocharger 100 includes a rotational shaft 102, a compressor 104, a turbine 106, and a vibration monitoring device 1 according to the first embodi-ment. The compressor 104 is disposed at one end (the left end in FIG. 1) of the rotational shaft 102 in the direction of the axis O. The turbine 106 is disposed at the other end (the right end in FIG. 1) of the rotational shaft 102 in the direction of the axis O. The rotational shaft 102 connects the compressor 104 and the turbine 106.

The compressor 104 compresses intake air and supplies it to an engine (not shown). The turbine 106 converts the energy of exhaust gas discharged from the engine into rotational energy of the turbine 106 when the exhaust gas passes through the turbine 106. The rotational shaft 102 rotates about the axis O with the rotation of the turbine 106. The compressor 104 is driven as the rotational shaft 102 rotates.

In the embodiment illustrated in FIG. 1, the rotational shaft 102 includes a marker portion 108 configured such that a rotation signal A, which will be described alter, has a pulse waveform. The marker portion 108 is disposed between the compressor 104 and the turbine 106 in the axis O direction. The marker portion 108 is disposed closer to the turbine 106 between the compressor 104 and the turbine 106 in the axis O direction. In some embodiments, the marker portion 108 is disposed closer to one end of the rotational shaft 102 than the compressor 104 in the axis O direction.

Figure 2:
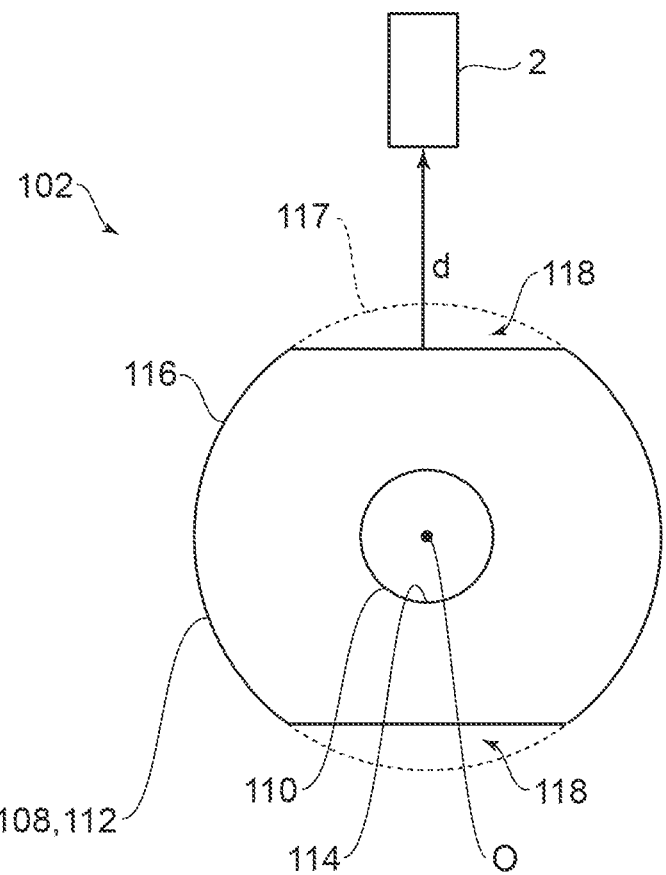
FIG. 2 is a schematic configuration diagram of a marker portion according to the first embodiment.

A configuration example of the marker portion 108 will be described. FIG. 2 is a schematic configuration diagram of the marker portion 108 according to the first embodiment. In the embodiment illustrated in FIG. 2, the rotational shaft 102 includes an inner rotating body 110 and an outer rotating body 112. The inner rotating body 110 of the rotational shaft 102 rotates about the axis O as the turbine 106 rotates. The outer rotating body 112 has a hole 114 into which the inner rotating body 110 is fitted. In other words, the outer rotating body 112 is attached to the inner rotating body 110 so as to cover the outer peripheral surface of the inner rotating body 110. The outer rotating body 112 rotates as the inner rotating body 110 fitted in the hole 114 rotates. The outer rotating body 112 includes a groove 118 formed on the outer periph-eral surface 116. If the groove 118 is not formed, the outer peripheral surface 116 of the outer rotating body 112 has a circular shape. The groove 118 is formed by cutting out a portion 117 of the circular outer peripheral surface 116 toward the axis O. In the embodiment illustrated in FIG. 2, the outer rotating body 112 includes two grooves 118, and the outer peripheral surface 116 has an oval shape. One groove 118 is located on the opposite side of the axis O from the other groove 118. The two grooves 118 are formed in the outer rotating body 112 symmetrically about the axis O. Such an outer rotating body 112 corresponds to the marker portion 108.

However, the marker portion 108 is not limited to the embodiment illustrated in FIG. 2 as long as the rotation signal A has a pulse waveform. For example, the marker portion 108 (outer rotating body 112) may include a protrusion that protrudes radially outward from a portion 117 of the outer peripheral surface 116, instead of the groove 118.

(Configuration of Vibration Monitoring Device According to First Embodiment)

As shown in FIG. 1, the vibration monitoring device 1 includes a rotation sensor 2, an output device 4, and a first low-pass filter 6. Each of the output device 4 and the first low-pass filter 6 is electrically connected to the rotation sensor 2 so that an output value (rotation signal A) of the rotation sensor 2 can be obtained. The first low-pass filter 6 is electrically connected to the output device 4 so that an output value (filter command value D) of the output device 4 can be obtained.

The rotation sensor 2 outputs a rotation signal A synchro-nized with the rotation of the rotational shaft 102. The rotation sensor 2 is an eddy current displacement sensor for detecting a distance d to the outer peripheral surface 116 of the rotational shaft 102 by generating an eddy current on the outer peripheral surface 116 of the rotational shaft 102. More specifically, the rotation sensor 2 is composed of a coil that generates a high-frequency magnetic flux, and using the high-frequency magnetic flux generated by the coil, a change in the eddy current generated on the outer peripheral surface 116 of the rotational shaft 102, which is a target (object to be measured), is detected as a change in the impedance of the coil. In other words, the rotation sensor 2 detects a change in the distance d with the rotation of the rotational shaft 102 as a change in the impedance of the coil, and the maximum output is obtained when the outer periph-eral surface 116 of the rotational shaft 102 comes closest to the rotation sensor 2.

However, the rotation sensor 2 is not limited to an eddy current displacement sensor. In some embodiments, the rotation sensor 2 may be a laser displacement sensor, equipped with a laser head which emits a laser beam, for detecting a distance from the laser head to the outer periph-eral surface 116 of the rotational shaft 102 by reflected light of the laser beam by irradiating the outer peripheral surface 116 of the rotational shaft 102 with the laser beam from the laser head.

Figure 3:
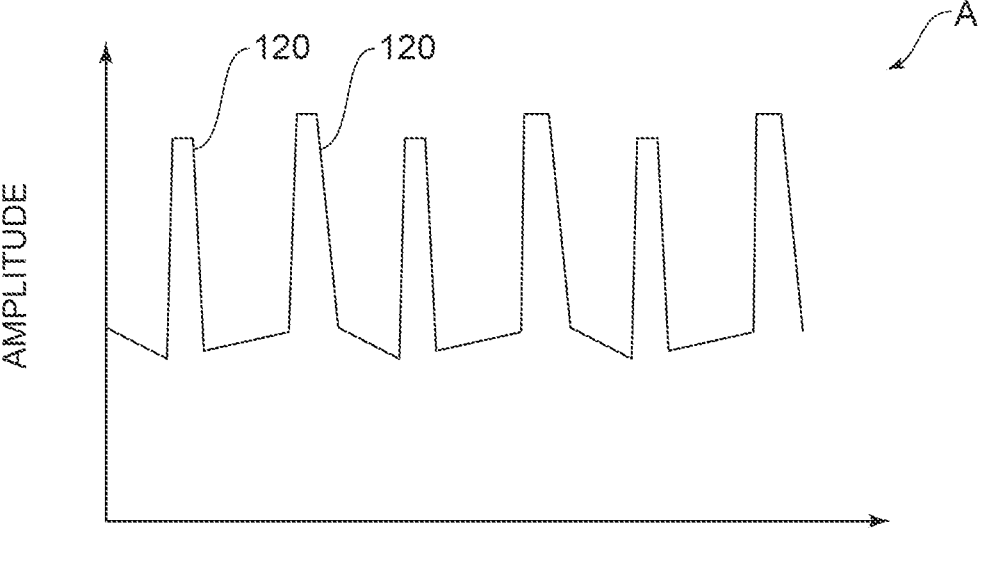
FIG. 3 is a waveform diagram of a rotation signal output by a rotation sensor according to the first embodiment.

FIG. 3 is a waveform diagram of a rotation signal A output by the rotation sensor 2 according to the first embodiment. As shown in FIG. 3, the rotation signal A has a pulse waveform formed with the rotation of the rotational shaft 102 since the marker portion 108 (outer rotating body 112) of the rotational shaft 102 includes the groove 118. Specifi-cally, during the rotation of the rotational shaft 102, the displacement changes significantly when the rotation sensor 2 and the groove 118 face each other. Conversely, during the rotation of the rotational shaft 102, the displacement changes little when the rotation sensor 2 and the groove 118 do not face each other. In the first embodiment, since the marker portion 108 has two grooves 118, two pulses (the portions 120 where the displacement of the waveform changes significantly) appear during one rotation of the rotational shaft 102.

The output device 4 outputs a filter command value D corresponding to the rotation speed C of the rotational shaft 102 calculated from the rotation signal A. The output device 4 is a computer such as an electronic control unit, and includes a processor such as CPU or GPU, a memory such as ROM or RAM, and an I/O interface (not shown). The output device 4 operates the processor (e.g., computation) in accordance with a program loaded to the memory, and thereby functional units of the output device 4 are implemented. The functional units of the output device 4 according to the first embodiment will be described with reference to FIG. 4.

Figure 4:
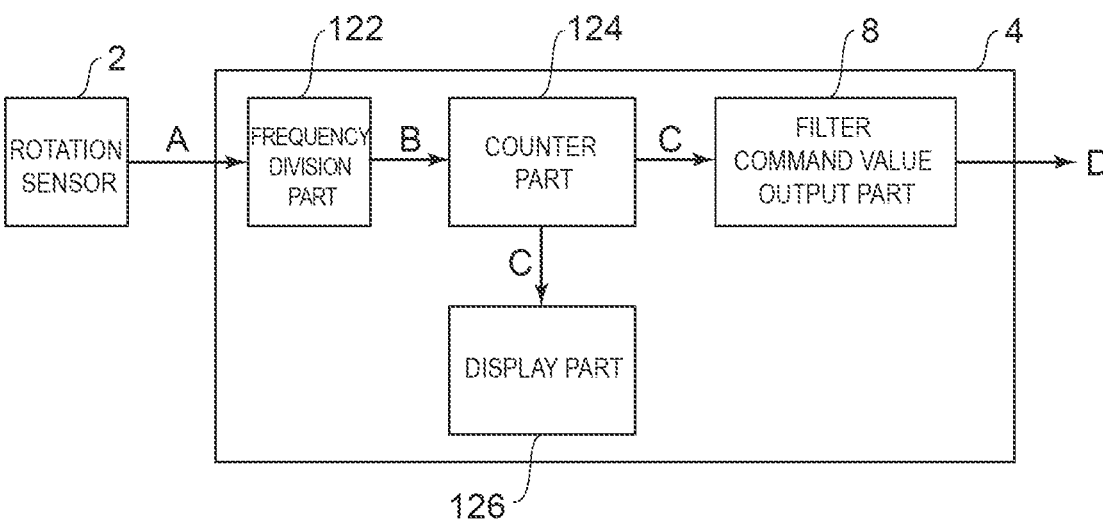
FIG. 4 is a schematic functional block diagram of an output device according to the first embodiment.

FIG. 4 is a schematic functional block diagram of the output device 4 according to the first embodiment. As shown in FIG. 4, the output device 4 includes a frequency division part 122, a counter part 124, a display part 126, and a filter command value output part 8.

Figure 5:
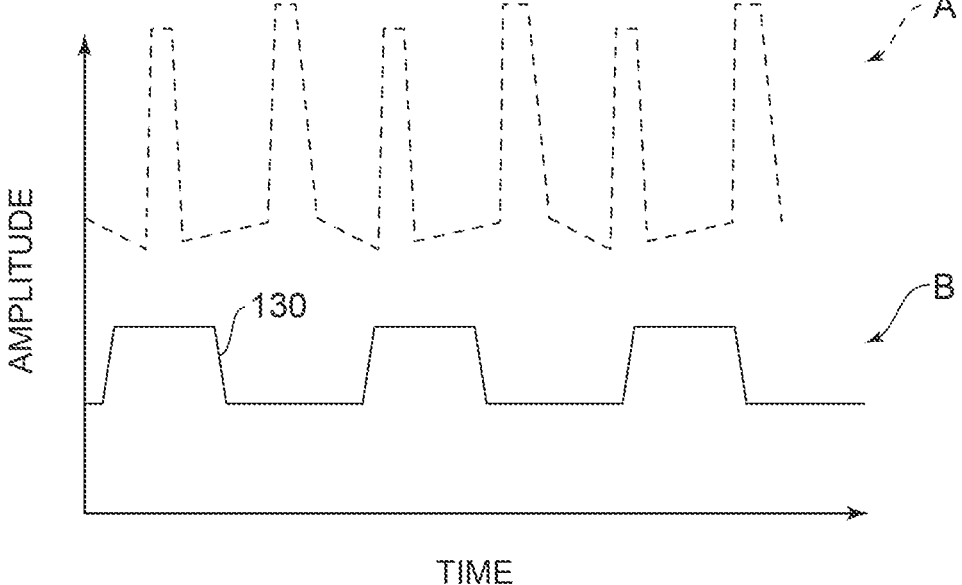
FIG. 5 is a waveform diagram of a rotation pulse signal obtained by dividing the frequency of the rotation signal of FIG. 3.

FIG. 5 is a waveform diagram of a rotation pulse signal B obtained by dividing the frequency of the rotation signal A of FIG. 3. As shown in FIG. 5, the frequency division part 122 divides the frequency of the rotation signal A output by the rotation sensor 2 to convert it into a rotation pulse signal B containing one pulse (the portion 130 where the displacement of the waveform changes significantly) during one rotation of the rotational shaft 102.

The counter part 124 counts the number of pulses contained in the rotation pulse signal B per unit time, and calculates the rotation speed C of the rotational shaft 102. The display part 126 displays the rotation speed C of the rotational shaft 102 calculated by the counter part 124 on a display device such as a monitor. The display device may be included in the output device 4 or may be provided separately from the output device 4.

The filter command value output part 8 outputs a filter command value D corresponding to the rotation speed C of the rotational shaft 102 calculated by the counter part 124. In the first embodiment, the filter command value D is a voltage value obtained by converting the rotation speed C of the rotational shaft 102 by a conversion method set in advance. This conversion method is set based on the characteristics of a first low-pass filter 6, which will be described later. In the first embodiment, as the rotation speed C of the rotational shaft 102 increases, the filter command value D (voltage value) increases. In some embodiments, the rotation speed C of the rotational shaft 102 and the filter command value D are proportional to each other. In some embodiments, the filter command value D is a current value obtained by converting the rotation speed C of the rotational shaft 102 by a conversion method set in advance.

As shown in FIG. 1, the first low-pass filter 6 outputs (extracts) a vibration signal E in response to input of the rotation signal A and the filter command value D. The vibration signal E is a signal from which vibration information of the rotational shaft 102 can be obtained. The vibration information includes, for example, the frequency of vibration, the magnitude of vibration, or the velocity of vibration.

The first low-pass filter 6 is configured such that the first cutoff frequency P1 is set according to the filter command value D (voltage value). The first low-pass filter 6 passes a rotation signal A with a frequency lower than the first cutoff frequency P1 and blocks a rotation signal A with a frequency higher than or equal to the first cutoff frequency P1 among rotation signals A output by the rotation sensor 2. The first low-pass filter 6 extracts the rotation signal A lower than the first cutoff frequency P1 as the vibration signal E. Thus, the signal passband (frequency band lower than the first cutoff frequency P1) of the first low-pass filter 6 is set according to the filter command value D, and the first low-pass filter 6 extracts, from the rotation signal A, a signal in the passband set according to the filter command value D as the vibration signal E.

Figure 6:
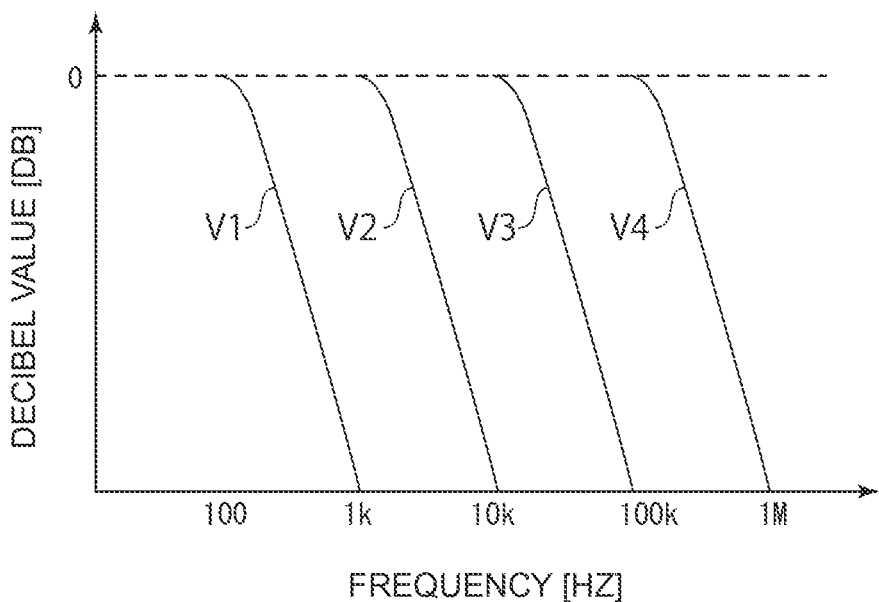
FIG. 6 is a diagram showing a table of characteristics of a first low-pass filter according to the first embodiment.

Here, the setting of the first cutoff frequency P1 will be described. FIG. 6 is a diagram showing a table of characteristics of the first low-pass filter 6 according to the first embodiment. In FIG. 6, the horizontal axis represents the frequency shown on a logarithmic scale, and the vertical axis represents the decibel value. In FIG. 6, V1 is the characteristics of the first low-pass filter 6 when the voltage value (filter command value D) is 0.01 V, V2 is the characteristics of the first low-pass filter 6 when the voltage value is 0.1 V, V3 is the characteristics of the first low-pass filter 6 when the voltage value is 1 V, and V4 is the characteristics of the first low-pass filter 6 when the voltage value is 10 V.

The decibel value corresponds to the signal strength. If the decibel value is less than 0, the vibration signal E extracted by the first low-pass filter 6 is attenuated. As shown in FIG. 6, at each voltage value (V1 to V4), as the frequency increases, the decibel value decreases, and the attenuation rate of the vibration signal E increases. More specifically, when the voltage value input to the first low-pass filter 6 is 0.1 V (V2 in FIG. 6), the vibration signal E is extracted by blocking a rotation signal A of 1 kHz or higher among rotation signals A input to the first low-pass filter 6. In the first embodiment, the first low-pass filter 6 has the first cutoff frequency P1 set such that the decibel value is zero. For example, the first low-pass filter 6 has the first cutoff frequency of 1 kHz when the voltage value is 0.1V.

(Operation and Effect of Vibration Monitoring Device According to First Embodiment)

Figure 7:
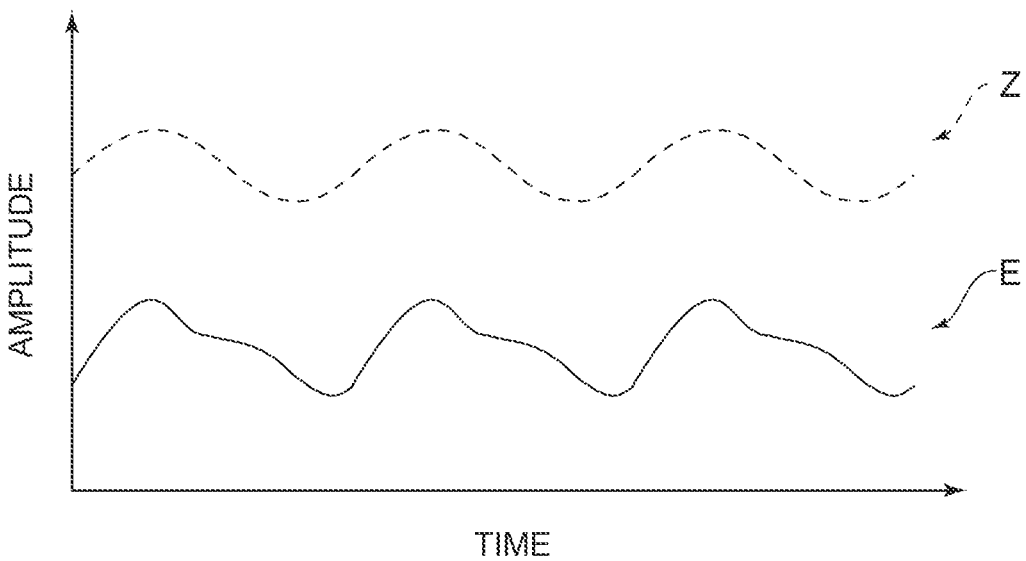
FIG. 7 is a waveform diagram of a vibration signal according to the first embodiment.

According to the present inventors, as shown in FIG. 7, when a rotation signal A (vibration signal E) lower than the first cutoff frequency P1 is extracted from rotation signals A of the rotational shaft 102, the waveform of the extracted signal resembles that of a net actual vibration signal Z generated by the vibration of the rotational shaft 102. Further, the inventors have found that the vibration signal E can be extracted precisely from the rotation signal A by setting the first cutoff frequency P1 in accordance with the rotation speed C of the rotational shaft 102.

According to the first embodiment, as shown in FIG. 1, the first low-pass filter 6 extracts, in response to input of the rotation signal A of the rotational shaft 102 and the filter command value D, a rotation signal A of the rotational shaft 102 lower than the first cutoff frequency P1 set according to the filter command value D as the vibration signal E. Thus, it is possible to evaluate the vibration of the rotational shaft 102 from the rotation signal A of the rotational shaft 102. Further, it is possible to monitor the vibration of the rotational shaft 102 without installing a vibration sensor that can directly detect the vibration of the rotational shaft 102.

Although not shown, in some embodiments, the vibration monitoring device 1 further includes a vibration notification device configured to acquire vibration information (frequency of vibration, magnitude of vibration, velocity of vibration, etc.) from the vibration signal E extracted by the first low-pass filter 6 and give notice of the vibration information. Such a vibration notification device may be, for example, a monitor which displays the vibration information, or an alert device which generates an alert sound or alert light when the vibration information acquired from the vibration signal E exceeds a preset threshold.

According to the first embodiment, since the filter command value D is a value corresponding to the rotation speed C of the rotational shaft 102, the first cutoff frequency P1 is set in accordance with the rotation speed C of the rotational shaft 102. Specifically, as the rotation speed C of the rotational shaft 102 increases, the first cutoff frequency P1 increases. Thus, since the first cutoff frequency P1 is set in accordance with the rotation speed C of the rotational shaft 102, the vibration signal E can be extracted precisely from the rotation signal A.

In many cases, the first low-pass filter 6 can set the first cutoff frequency P1 according to a voltage value. According to the first embodiment, since the filter command value D is a voltage value, the first cutoff frequency P1 can be freely set in accordance with the rotation speed C of the rotational shaft 102. Moreover, since such a first low-pass filter 6 is generally available on the market at a low cost, an increase in the installation cost of the vibration monitoring device 1 can be suppressed.

According to the first embodiment, since the rotational shaft 102 includes the marker portion 108, the rotation sensor 2 can output the rotation signal A with higher precision than when the rotation signal A is output from the rotational shaft 102 that does not include the marker portion 108.

According to the first embodiment, the rotation sensor 2 can be an eddy current sensor. Further, according to the first embodiment, since two grooves 118 are formed on the outer peripheral surface 116 of the rotational shaft 102, the rotation sensor 2 outputs the rotation signal A having two pulses during one rotation of the rotational shaft 102. A high-speed rotating body such as the rotational shaft 102 of the turbocharger 100 has an unbalanced shape if only one groove 118 is formed in an axial cross-sectional view of the rotational shaft 102, and this unbalanced shape of the rotational shaft 102 may cause the rotational shaft 102 to vibrate more. In contrast, as illustrated in the first embodiment, when two grooves 118 are formed on the outer peripheral surface 116 of the rotational shaft 102, it is possible to prevent the rotational shaft 102 from having an unbalanced shape. In some embodiments, one groove 118 is formed on the outer peripheral surface 116 of the rotational shaft 102, and the turbine 106 and the compressor 104 are mounted on the rotational shaft 102 so as to reduce the effect of unbalance due to the only one groove 118 being formed. In this case, the output device 4 does not have to include the frequency division part 122.

During operation of the turbocharger 100, the rotation speed C of the rotational shaft 102 provided in the turbocharger 100 often fluctuates. According to the first embodiment, the first low-pass filter 6 of the vibration monitoring device 1 has the first cutoff frequency P1 set in accordance with the rotation speed C of the rotational shaft 102. Therefore, when the turbocharger 100 is equipped with the vibration monitoring device 1, it is possible to provide the turbocharger 100 that can evaluate the vibration of the rotational shaft 102 of the turbocharger 100 from the rotation signal A of the rotational shaft 102 of the turbocharger 100. In addition, the application of the vibration monitoring device 1 to an exhaust turbocharger is very effective because the rotation speed C of the rotational shaft 102 of an exhaust turbocharger installed on a ship is particularly prone to fluctuations.

Second Embodiment

The vibration monitoring device 1 according to the second embodiment of the present disclosure will be described. The second embodiment is different from the first embodiment in that a second low-pass filter 10 is further provided, but the other configurations are the same as those described in the first embodiment. In the second embodiment, the same constituent elements as those in the first embodiment are associated with the same reference characters and thus not described again in detail.

(Configuration of Vibration Monitoring Device According to Second Embodiment)

Figure 8:
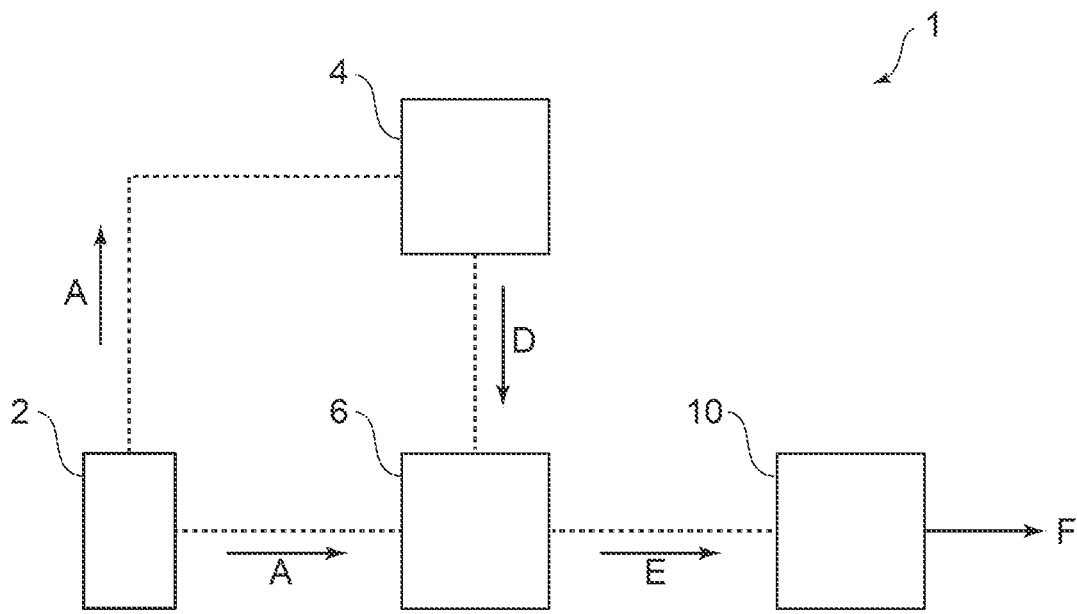
FIG. 8 is a schematic configuration diagram of a vibration monitoring device according to the second embodiment.

FIG. 8 is a schematic configuration diagram of the vibration monitoring device 1 according to the second embodiment. As shown in FIG. 8, the vibration monitoring device 1 further includes a second low-pass filter 10.

In the embodiment illustrated in FIG. 8, the second low-pass filter 10 is electrically connected to the first low-pass filter 6, and the vibration signal E extracted from the first low-pass filter 6 is input thereto. The second low-pass filter 10 outputs (extracts) a lifting signal F in response to input of the vibration signal E. The lifting signal F is a signal from which lifting information of the rotational shaft 102 can be obtained. The lifting information includes, for example, the difference (amount of lifting) between the vertical position of the rotational shaft 102 when the rotational shaft 102 is non-rotating and the vertical position of the rotational shaft 102 when the rotational shaft 102 is rotating.

The second low-pass filter 10 has a second cutoff frequency P2 lower than the first cutoff frequency P1. The second cutoff frequency P2 may be a fixed value. In some embodiments, the second cutoff frequency P2 is lower than 10 Hz. By setting the second cutoff frequency P2 to lower than 10 Hz, it is possible to eliminate the effects of rotation-synchronous vibration of the rotational shaft 102 and the effects of disturbances of other devices.

The second low-pass filter 10 passes a vibration signal E with a frequency lower than the second cutoff frequency P2 and blocks a vibration signal E with a frequency higher than or equal to the second cutoff frequency P2 among vibration signals E. The second low-pass filter 10 extracts the vibration signal E lower than the second cutoff frequency P2 as the lifting signal F. Thus, the signal passband (frequency band lower than the second cutoff frequency P2) of the second low-pass filter 10 is set according to the filter command value D, and the second low-pass filter 10 extracts, from the rotation signal A, a signal in the passband set according to the filter command value D as the lifting signal F.

(Operation and Effect of Vibration Monitoring Device According to Second Embodiment)

The present inventors have found that when a vibration signal E lower than the second cutoff frequency P2 is extracted from vibration signals E, a DC component signal is extracted, and the DC component signal corresponds to the lifting signal F. According to the second embodiment, the second low-pass filter 10 extracts, in response to input of the vibration signal E, a vibration signal E lower than the second cutoff frequency P2 as the lifting signal F. Thus, it is possible to evaluate the lifting of the rotational shaft 102 from the rotation signal A of the rotational shaft 102.

In the second embodiment, the second low-pass filter 10 is configured to receive the vibration signal E, but the present disclosure is not limited to this embodiment. In some embodiments, the second low-pass filter 10 is electrically connected to the rotation sensor 2 so that the rotation signal A output by the rotation sensor 2 is input thereto. Further, the second low-pass filter 10 outputs (extracts) the lifting signal F in response to input of the rotation signal A. Although not shown, in some embodiments, the vibration monitoring device 1 further includes a lifting amount notification device configured to acquire lifting information from the lifting signal F and give notice of the lifting information.

(Vibration Monitoring Method)

Figure 9:
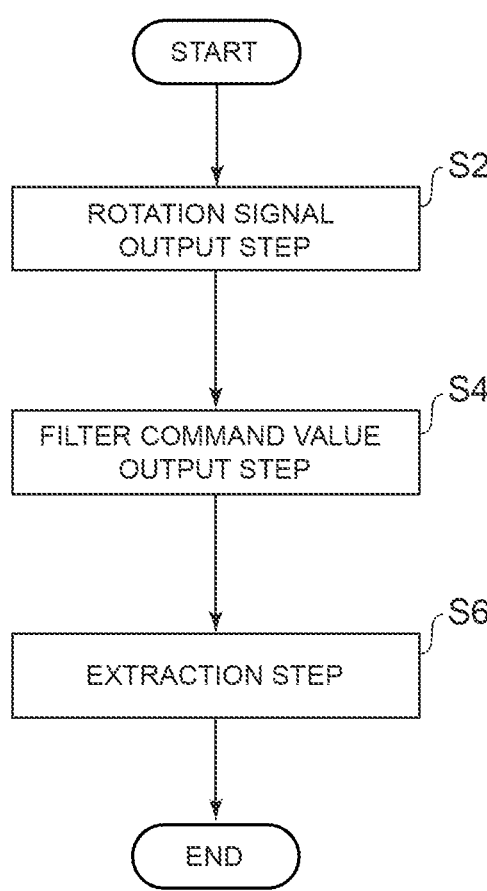
FIG. 9 is a flowchart of a vibration monitoring method according to the present disclosure.

FIG. 9 is a flowchart of a vibration monitoring method according to the present disclosure. As shown in FIG. 9, the vibration monitoring method includes a rotation signal output step (S2), a filter command value output step (S4), and an extraction step (S6).

The contents described in the above embodiments would be understood as follows, for instance.

In the rotation signal output step S2, a rotation signal A synchronized with the rotation of the rotational shaft 102 is output. In the filter command value output step S4, a filter command value D corresponding to the rotation speed C of the rotational shaft 102 calculated from the rotation signal A is output. In the extraction step S6, in response to input of the rotation signal A and the filter command value D, a rotation signal A lower than the first cutoff frequency P1 set according to the filter command value D is extracted as a vibration signal E from which vibration information of the rotational shaft 102 can be obtained. With this vibration monitoring method, it is possible to evaluate the vibration of the rotational shaft 102 from the rotation signal A of the rotational shaft 102.

Third Embodiment

The vibration monitoring device 1 according to the third embodiment of the present disclosure will be described. In the vibration monitoring device 1 according to the third embodiment, unless otherwise stated, common reference characters with the vibration monitoring device 1 according to the first embodiment denote the same constituent components as those in the vibration monitoring device 1 according to the first embodiment, and the description thereof will be omitted.

(Configuration of Vibration Monitoring Device According to Third Embodiment)

Figure 10:
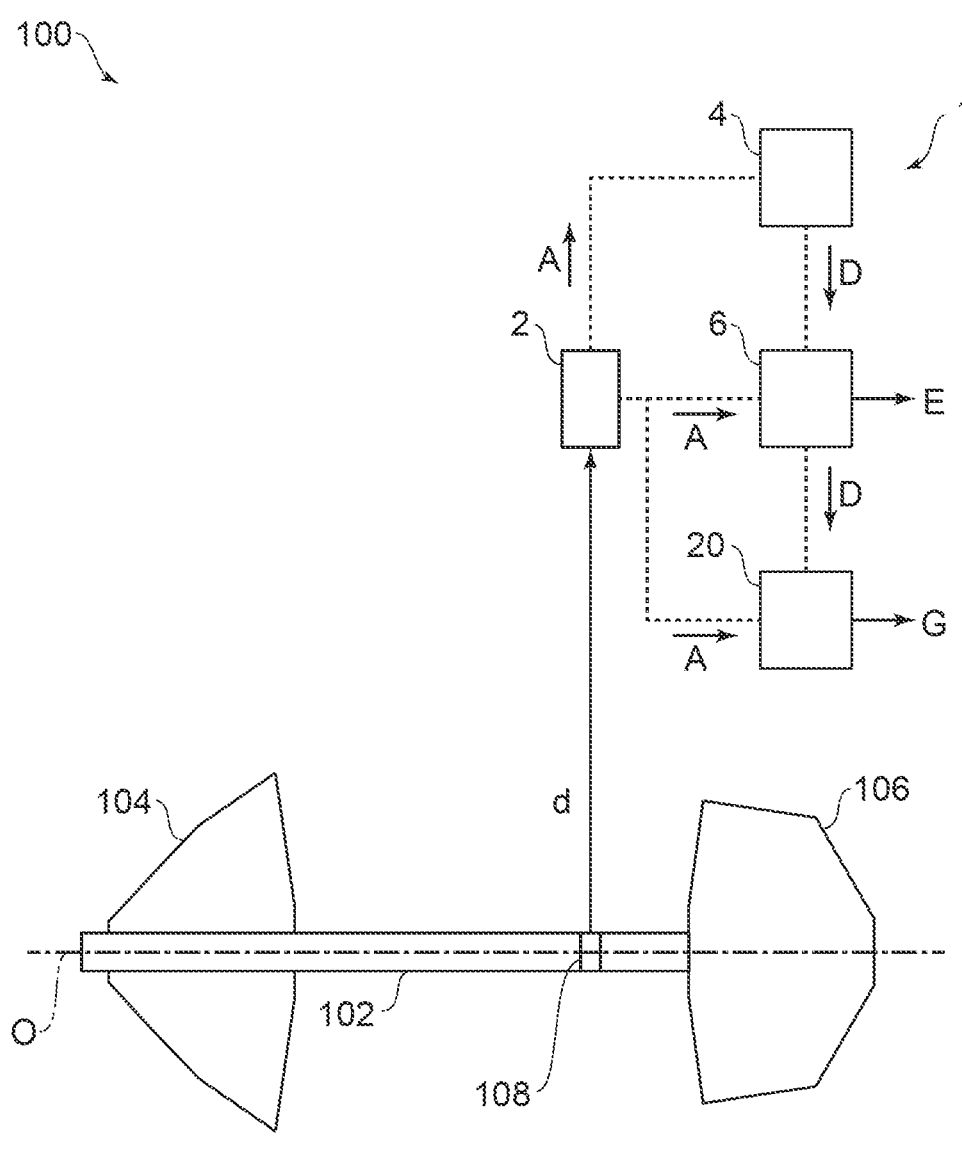
FIG. 10 is a schematic configuration diagram of a vibration monitoring device according to the third embodiment.

FIG. 10 is a schematic configuration diagram of the vibration monitoring device 1 according to the third embodiment. As shown in FIG. 10, the vibration monitoring device 1 further includes a band-pass filter 20 in addition to the configuration according to the first embodiment.

The band-pass filter 20 extracts, in response to input of the rotation signal A output by the rotation sensor 2 and the filter command value D output by the output device 4, a signal G in a passband set according to the filter command value D from the rotation signal A as a vibration signal G from which vibration information of the rotational shaft can be obtained, and outputs the vibration signal G. The vibration information includes, for example, the frequency of the vibration signal G, the magnitude (amplitude) of vibration, or the velocity of vibration. In the example shown in FIG. 10, the filter command value D is input from the output device 4 via the first low-pass filter 6 to the band-pass filter 20, but the filter command value D may be input from the output device 4 to the band-pass filter 20 not via the first low-pass filter 6.

Figure 11:
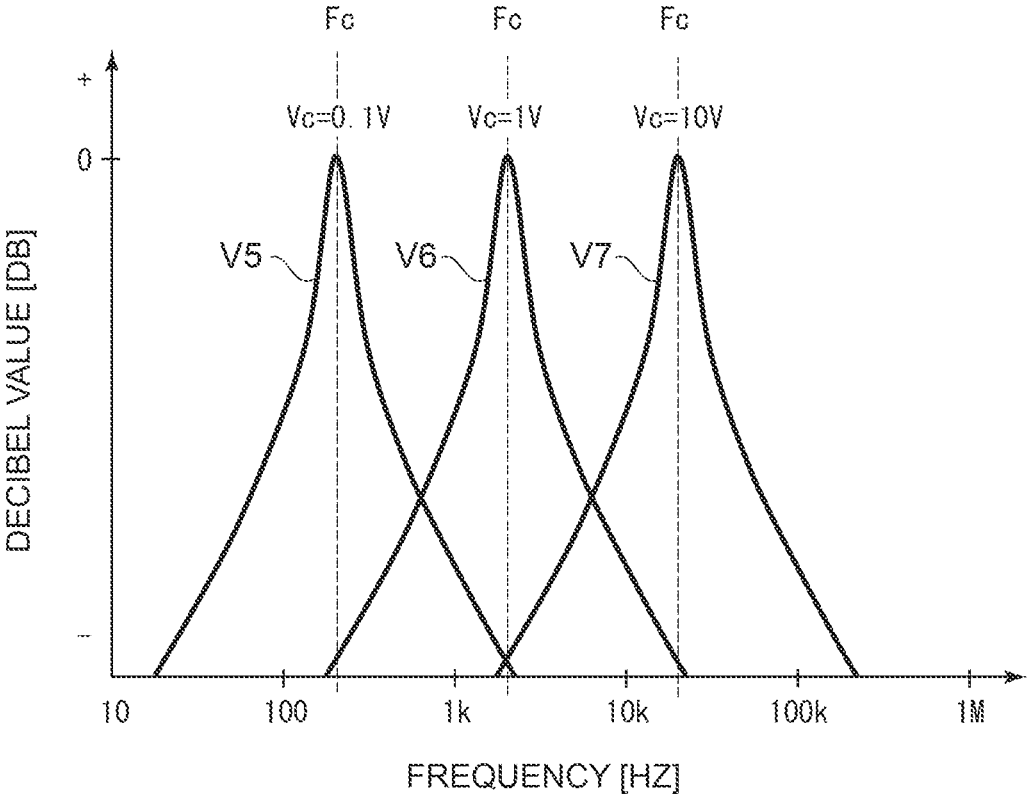
FIG. 11 is a diagram showing amplitude-frequency characteristics of a band-pass filter.

FIG. 11 is a diagram showing amplitude-frequency characteristics of the band-pass filter 20. In FIG. 11, the horizontal axis represents the frequency shown on a logarithmic scale, and the vertical axis represents the decibel value. In FIG. 11, V5 is the characteristics of the band-pass filter 20 when the voltage value (filter command value D) is 0.1 V, V6 is the characteristics of the band-pass filter 20 when the voltage value is 1 V, and V7 is the characteristics of the band-pass filter 20 when the voltage value is 10 V.

In FIG. 11, the decibel value corresponds to the signal strength. If the decibel value is less than 0, the vibration signal E extracted by the band-pass filter 20 is attenuated. As shown in FIG. 11, at each voltage value (V5 to V7), as the frequency moves away from the center frequency Fc of the passband of the band-pass filter 20, the decibel value decreases, and the attenuation rate of the vibration signal G increases. The center frequency Fc is set according to the filter command value D (value corresponding to the rotation speed C) output by the output device 4. Specifically, the center frequency Fc is set to match or substantially match the rotation speed C of the rotational shaft 102 counted by the counter part 124 (see FIG. 4) of the output device 4. For example, the band-pass filter 20 may attenuate the vibration signal G according to the filter command value D so as to satisfy $0.8C \leq Fc \leq 1.2C$. Further, when the rotation speed C of the rotational shaft 102 and the filter command value D are proportional, the center frequency Fc may be set so that the filter command value D and the center frequency Fc are proportional. Further, the upper and lower limits of the passband of the band-pass filter 20 are set on both sides of the center frequency Fc according to the filter command value D.

(Operation and Effect of Vibration Monitoring Device According to Third Embodiment)

Figure 12:
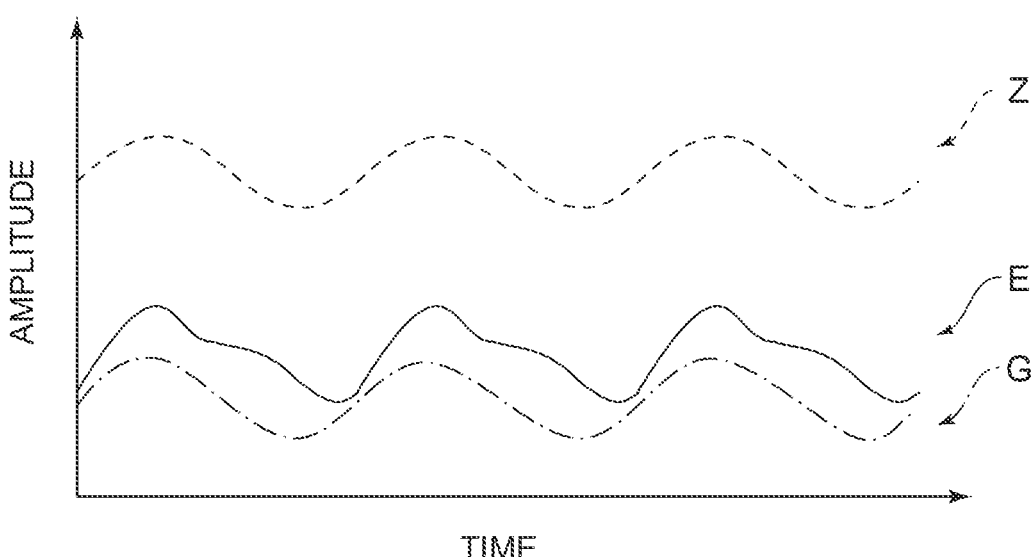
FIG. 12 is a waveform diagram showing respective waveforms of a vibration signal extracted by the first low-pass filter, a vibration signal extracted by the band-pass filter, and a net actual vibration signal generated by vibration of the rotational shaft.

FIG. 12 is a waveform diagram showing respective waveforms of a vibration signal E extracted by the first low-pass filter 6, a vibration signal G extracted by the band-pass filter 20, and a net actual vibration signal Z generated by vibration of the rotational shaft 102. As described above, in the third embodiment, the center frequency Fc of the band-pass filter 20 is set to match or substantially match the rotation speed C of the rotational shaft 102 (for example, to satisfy $0.8C \leq Fc \leq 1.2C$). Therefore, as shown in FIG. 12, the waveform of the vibration signal G extracted by the band-pass filter 20 resembles that of the net actual vibration signal Z generated by vibration of the rotational shaft 102, and the vibration synchronized with the rotation of the rotational shaft 102 (vibration with a frequency one times the rotation speed C) can be evaluated precisely based on the vibration signal G. As a result, it is possible to evaluate and determine the unbalance of the rotor of the turbocharger 100 (for example, the unbalance due to scale adhesion), the bending of the rotor, the contact between the rotor and the casing, etc., and it is possible to propose the optimum maintenance of the turbocharger 100 and prevent failures, and the like.

Although not shown, in the third embodiment, the vibration monitoring device 1 further includes a vibration notification device configured to acquire vibration information (frequency of vibration, magnitude of vibration, velocity of vibration, etc.) from each of the vibration signal E extracted by the first low-pass filter 6 and the vibration signal G extracted by the band-pass filter 20, and give notice of the vibration information. Such a vibration notification device may be, for example, a monitor which displays the vibration information, or an alert device which generates an alert sound or alert light when the vibration information acquired from the vibration signal E exceeds a preset threshold.

Fourth Embodiment

The vibration monitoring device 1 according to the fourth embodiment of the present disclosure will be described. In the vibration monitoring device 1 according to the fourth embodiment, unless otherwise stated, common reference characters with the vibration monitoring device 1 according to the third embodiment denote the same constituent components as those in the vibration monitoring device 1 according to the third embodiment, and the description thereof will be omitted.

(Configuration of Vibration Monitoring Device According to Fourth Embodiment)

Figure 13:
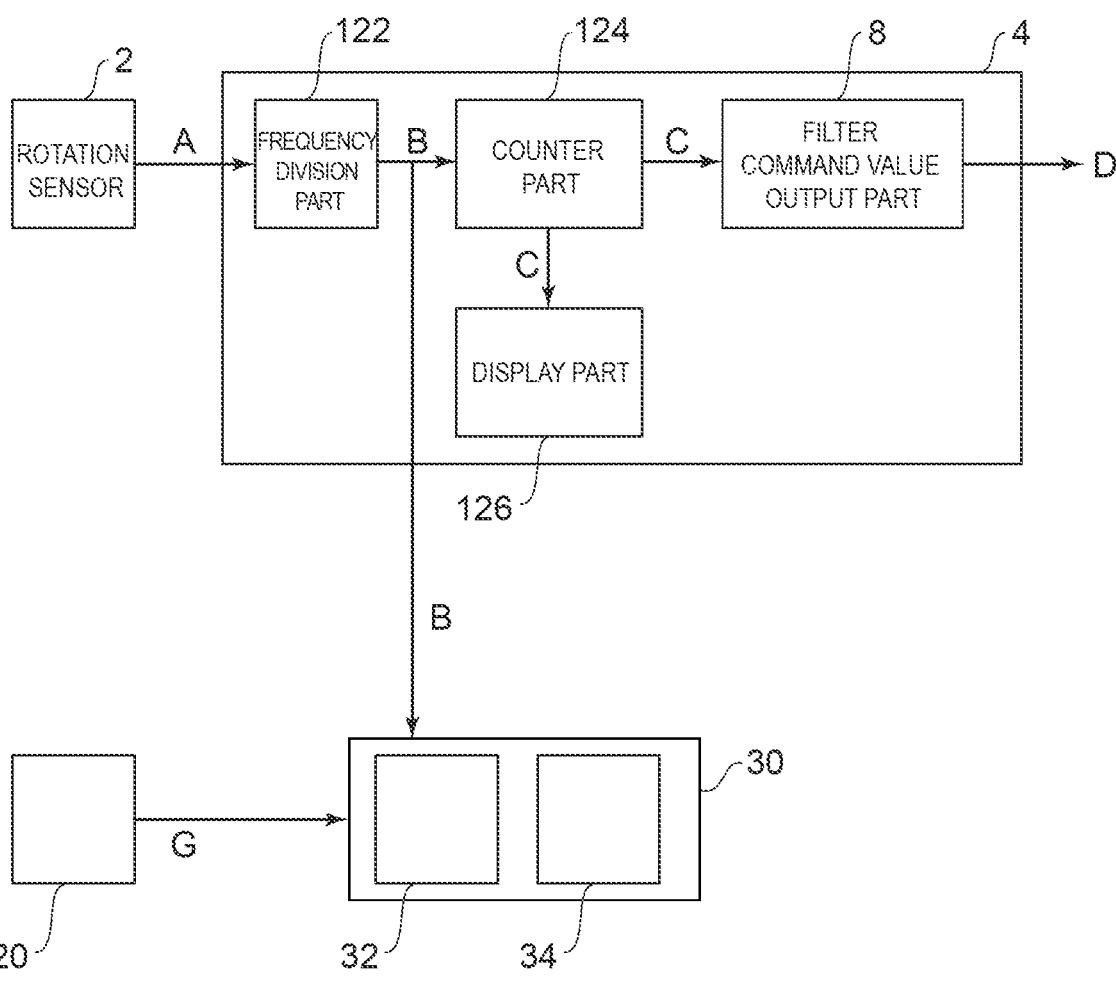
FIG. 13 is a schematic configuration diagram of a part of a vibration monitoring device according to the fourth embodiment.

FIG. 13 is a schematic configuration diagram of a part of the vibration monitoring device 1 according to the fourth embodiment. As shown in FIG. 13, the vibration monitoring device 1 further includes a vector monitor 30 (display device) in addition to the configuration according to the third embodiment.

The vector monitor 30 receives the output signal of the rotation sensor 2 (in the illustrated example, the rotation pulse signal B output by the frequency division part 122) and the vibration signal G extracted by the band-pass filter 20. The vector monitor 30 includes a detection part 32 for detecting the amplitude of the vibration signal G and the phase angle of the vibration signal G (for example, the phase angle with respect to the pulse 130 of the rotation pulse signal B) based on these input signals (rotational pulse signal B and vibration signal G), and a display part 34 for displaying the amplitude of the vibration signal G and the phase angle of the vibration signal G detected by the detection part 32.

(Operation and Effect of Vibration Monitoring Device According to Fourth Embodiment)

By detecting the amplitude and phase of the vibration synchronized with the rotation of the rotational shaft 102 (vibration with a frequency one times the rotation speed C) and displaying them on the display part 34, the vibration synchronized with the rotation of the rotational shaft 102 can be evaluated precisely, and for example, the critical speed of the shaft system of the turbocharger 100, the contact event, and the unbalance as described above can be determined precisely.

Fifth Embodiment

The vibration monitoring device 1 according to the fifth embodiment of the present disclosure will be described. In the vibration monitoring device 1 according to the fifth embodiment, unless otherwise stated, common reference characters with the vibration monitoring device 1 according to the third embodiment denote the same constituent components as those in the vibration monitoring device 1 according to the third embodiment, and the description thereof will be omitted.

(Configuration of Vibration Monitoring Device According to Fifth Embodiment)

Figure 14:
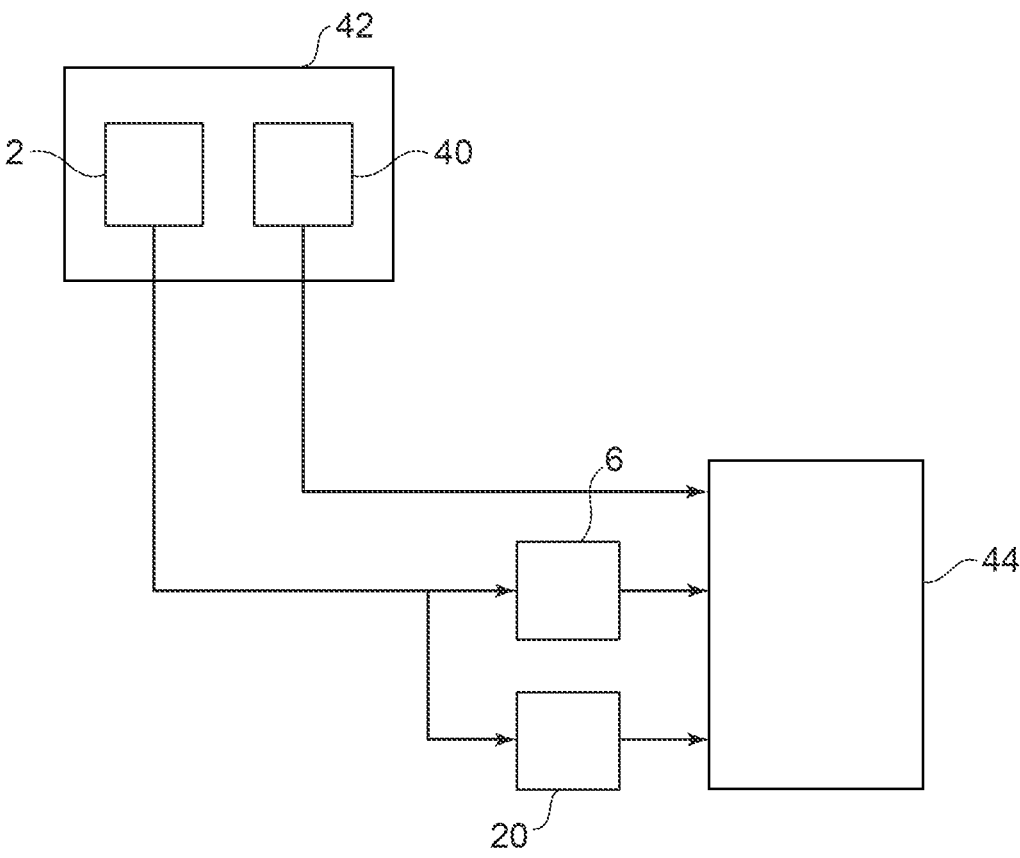
FIG. 14 is a schematic configuration diagram of a part of a vibration monitoring device according to the fifth embodiment.

FIG. 14 is a schematic configuration diagram of a part of the vibration monitoring device 1 according to the fifth embodiment. The vibration monitoring device 1 according to the fifth embodiment further includes a MEMS sensor 40 (MEMS: Micro Electro Mechanical Systems) for detecting vibration of an engine (not shown) connected to the turbocharger 100 in addition to the configuration according to the third embodiment. The MEMS sensor 40 is an acceleration sensor for detecting vibration of the engine.

The vibration monitoring device 1 according to the fifth embodiment includes a housing 42 (junction box) which accommodates the rotation sensor 2, and the MEMS sensor 40 is installed inside the housing 42 together with the rotation sensor 2. The housing 42 is disposed, for example, between the turbocharger 100 and the engine. When the turbocharger 100 is mounted on the top of the engine, the housing 42 is disposed below the turbocharger 100.

Further, the vibration monitoring device 1 includes a display part 44 configured to simultaneously display vibration information of the engine obtained from output of the MEMS sensor 40, vibration information of the rotational shaft 102 obtained from the vibration signal E extracted by the first low-pass filter 6, and vibration information of the rotational shaft 102 obtained from the vibration signal G extracted by the band-pass filter 20. These vibration information include, for example, the frequency of vibration, the magnitude (amplitude) of vibration, or the velocity of vibration.

Figure 15:
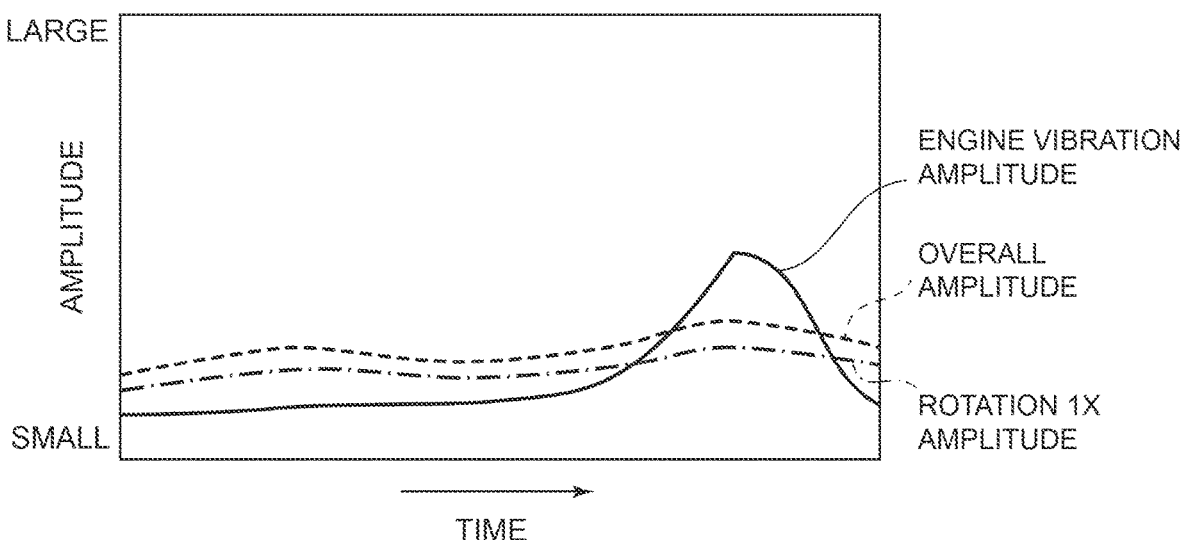
FIG. 15 is a diagram showing an example of display contents of a display part.

FIG. 15 is a diagram showing an example of display contents of the display part 44. In the example shown in FIG. 15, the display part 44 displays the amplitude of vibration of the engine as the vibration information of the engine obtained from output of the MEMS sensor 40. Further, the display part 44 displays the amplitude of the vibration signal E (overall amplitude) as the vibration information of the rotational shaft 102 obtained from the vibration signal E extracted by the first low-pass filter 6. Further, the display part 44 displays the amplitude of the vibration signal G (rotation 1x amplitude: the amplitude of vibration with a frequency 1 times the rotation speed C) as the vibration information of the rotational shaft 102 obtained from the vibration signal G extracted by the band-pass filter 20.

(Operation and Effect of Vibration Monitoring Device According to Fifth Embodiment)

The MEMS sensor 40 can indirectly obtain vibration information of the engine, and by simultaneously displaying the vibration information of the engine and the vibration information of the rotational shaft 102 of the turbocharger 100 on the display part 44, vibration of the rotational shaft 102 of the turbocharger 100 and vibration of the engine can be evaluated without confusion. Thus, it is possible to precisely evaluate and determine vibration of the rotational shaft 102 of the turbocharger 100. Moreover, the MEMS sensor 40 is inexpensive, and the vibration of the rotational shaft 102 of the turbocharger 100 can be evaluated inexpensively and precisely without installing a temporary vibration sensor.

In some embodiments, in the example shown in FIG. 14, the monitoring device may include, in addition to or instead of the display part 44, a data record part configured to record vibration information of the engine obtained from output of the MEMS sensor 40, vibration information of the rotational shaft 102 obtained from the vibration signal E extracted by the first low-pass filter 6, and vibration information of the rotational shaft 102 obtained from the vibration signal G extracted by the band-pass filter 20.

Sixth Embodiment

The vibration monitoring device 1 according to the sixth embodiment of the present disclosure will be described. In the vibration monitoring device 1 according to the sixth embodiment, unless otherwise stated, common reference characters with the vibration monitoring device 1 according to the fifth embodiment denote the same constituent components as those in the vibration monitoring device 1 according to the third embodiment, and the description thereof will be omitted.

(Configuration of Vibration Monitoring Device According to Sixth Embodiment)

Figure 16:
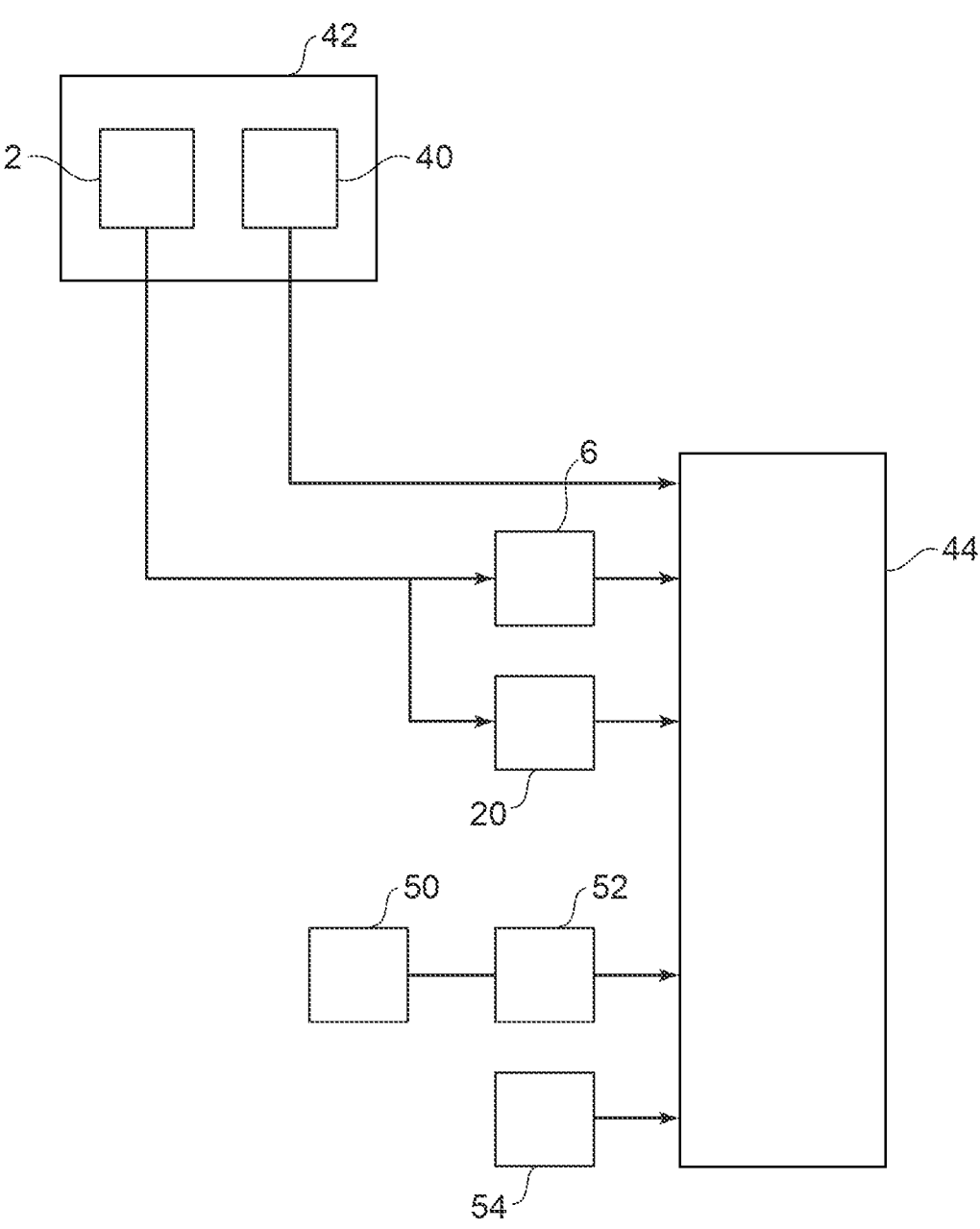
FIG. 16 is a schematic configuration diagram of a part of a vibration monitoring device according to the sixth embodiment.

FIG. 16 is a schematic configuration diagram of a part of the vibration monitoring device 1 according to the sixth embodiment. As shown in FIG. 16, the vibration monitoring device 1 according to the sixth embodiment further includes a bearing temperature sensor 52 for detecting the temperature of a bearing 50 rotatably supporting the rotational shaft 102 (see FIG. 10) in the turbocharger 100, and a lubricant oil outlet temperature sensor 54 for detecting the temperature of the outlet of lubricant oil (lubricant oil supplied to the bearing 50) in the turbocharger 100 in addition to the configuration according to the fifth embodiment.

The display part 44 according to the sixth embodiment simultaneously displays vibration information of the engine obtained from output of the MEMS sensor 40, vibration information of the rotational shaft 102 obtained from the vibration signal E extracted by the first low-pass filter 6, vibration information of the rotational shaft 102 obtained from the vibration signal G extracted by the band-pass filter 20, the temperature of the bearing 50 detected by the bearing temperature sensor 52, and the temperature of the lubricant oil outlet in the turbocharger 100 detected by the lubricant oil outlet temperature sensor 54.

Figure 17:
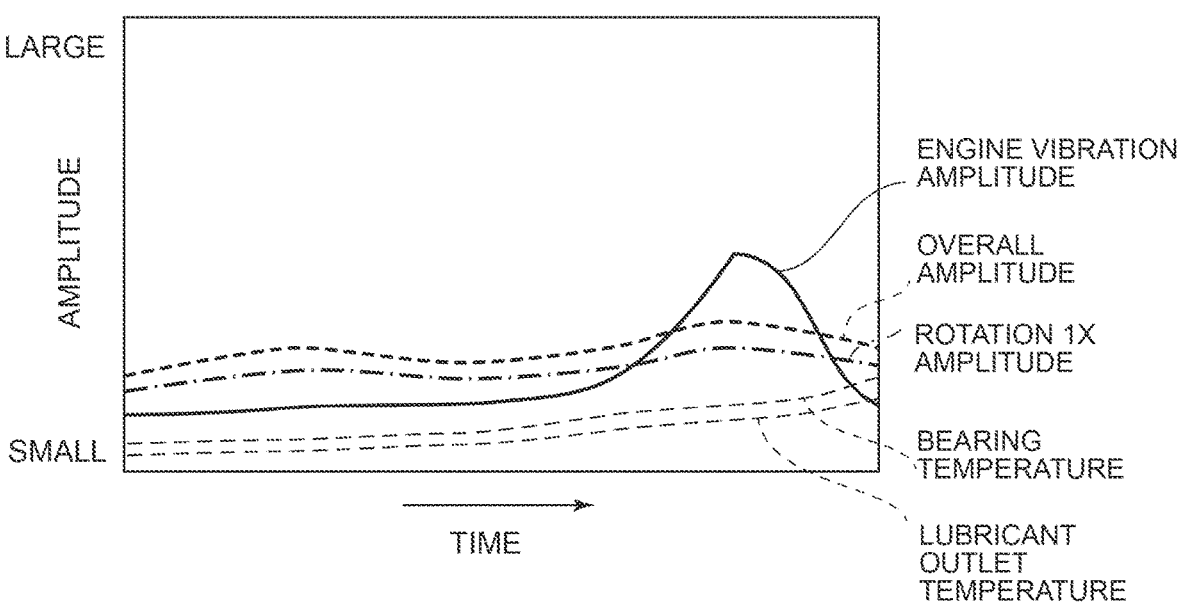
FIG. 17 is a diagram showing an example of display contents of a display part.

FIG. 17 is a diagram showing an example of display contents of the display part 44. In the example shown in FIG. 17, the display part 44 simultaneously displays, in addition to the contents illustrated in FIG. 15, the temperature of the bearing 50 (bearing temperature) and the temperature of lubricant oil at the lubricant oil outlet of the turbocharger 100 (lubricant oil outlet temperature).

(Operation and Effect of Vibration Monitoring Device According to Sixth Embodiment)

In addition to the effects described in the fifth embodiment, the condition of the turbocharger 100 can be evaluated precisely from the temperature of the bearing 50 and the temperature of the lubricant oil outlet in the turbocharger 100, leading to improved evaluation precision for preventive maintenance of the turbocharger 100.

In some embodiments, in the example shown in FIG. 16, the monitoring device may include, in addition to or instead of the display part 44, a data record part (not shown) configured to record vibration information of the engine based on output of the MEMS sensor 40, vibration information of the rotational shaft 102 obtained from the vibration signal E extracted by the first low-pass filter 6, vibration information of the rotational shaft 102 obtained from the vibration signal G extracted by the band-pass filter 20, the temperature of the bearing 50 detected by the bearing temperature sensor 52, and the temperature of the lubricant oil outlet in the turbocharger 100 detected by the lubricant oil outlet temperature sensor 54.

The present disclosure is not limited to the embodiments described above, but includes modifications to the embodiments described above, and embodiments composed of combinations of those embodiments. For example, although the third embodiment illustrates the configuration in which the vibration monitoring device 1 includes the first low-pass filter 6 and the band-pass filter 20, the vibration monitoring device 1 may include at least one of the first low-pass filter 6, the second low-pass filter 10, or the band-pass filter 20.

The contents described in the above embodiments would be understood as follows, for instance.

[1] A vibration monitoring device (1) according to the present disclosure includes: a rotation sensor (2) for outputting a rotation signal (A) synchronized with rotation of a rotational shaft (102); an output device (4) for outputting a filter command value (D) corresponding to a rotation speed (C) of the rotational shaft calculated from the rotation signal; and at least one filter (6, 10, 20) for extracting, in response to input of the rotation signal and the filter command value, a signal (E or G) in a passband set according to the filter command value from the rotation signal as a vibration signal (E or G) from which vibration information of the rotational shaft can be obtained.

With the above configuration [1], by setting the passband of the at least one filter in accordance with the rotation speed of the rotational shaft appropriately, a signal in the passband suitable for evaluating the vibration of the rotational shaft can be extracted from the rotation signal synchronized with the rotation of the rotational shaft. Thus, it is possible to evaluate the vibration of the rotational shaft from the rotation signal of the rotational shaft.

[2] In some embodiments, in the above configuration [1], the at least one filter includes a first low-pass filter (6). The first low-pass filter extracts, in response to input of the rotation signal and the filter command value, a signal (E) in a passband lower than a first cutoff frequency (P1) set according to the filter command value as the vibration signal (E).

The present inventors have found that when a rotation signal lower than the first cutoff frequency is extracted from rotation signals of the rotational shaft, the waveform of the extracted signal resembles that of a net actual vibration signal generated by the vibration of the rotational shaft. Further, the inventors have found that the vibration signal can be extracted precisely from the rotation signal by setting the first cutoff frequency in accordance with the rotation speed of the rotational shaft. With the above configuration [2], the first low-pass filter extracts, in response to input of the rotation signal of the rotational shaft and the filter command value, a rotation signal of the rotational shaft lower than the first cutoff frequency set according to the filter command value as the vibration signal. Thus, it is possible to evaluate the vibration of the rotational shaft from the rotation signal of the rotational shaft.

Additionally, with the above configuration [2], since the filter command value is a value corresponding to the rotation speed of the rotational shaft, the first cutoff frequency is set in accordance with the rotation speed of the rotational shaft. That is, since the first cutoff frequency is set in accordance with the rotation speed, the vibration signal can be extracted precisely from the rotation signal of the rotational shaft.

[3] In some embodiments, in the above configuration [2], the at least one filter further includes a second low-pass filter (10) having a second cutoff frequency (P2) lower than the first cutoff frequency.

With the above configuration [3], a signal lower than the second cutoff frequency (for example, a vibration signal lower than the second cutoff frequency) can be extracted.

[4] In some embodiments, in the above configuration [3], the second low-pass filter extracts, in response to input of the vibration signal extracted by the first low-pass filter, a signal (E) in a passband lower than the second cutoff frequency as a lifting signal (F) from which lifting information of the rotational shaft can be obtained.

The present inventors have found that when a vibration signal lower than the second cutoff frequency is extracted from vibration signals, the extracted signal corresponds to the lifting signal from which lifting information of the rotational shaft can be obtained. With the above configuration [4], the second low-pass filter further removes the vibration signal at the second cutoff frequency and extracts it as a DC signal (lifting signal). Thus, it is possible to evaluate the lifting of the rotational shaft from the rotation signal of the rotational shaft.

[5] In some embodiments, in any one of the above configurations [1] to [4], the at least one filter includes a band-pass filter. The band-pass filter extracts, in response to input of the rotation signal and the filter command value, a signal (G) in a passband including a center frequency (Fc) set according to the filter command value from the rotation signal as the vibration signal (G).

With the above configuration [5], by setting the center frequency of the passband of the band-pass filter to match or substantially match the rotation speed of the rotational shaft, the vibration synchronized with the rotation of the rotational shaft (vibration with a frequency of one or approximately one times the rotation speed C) can be evaluated precisely based on the vibration signal extracted by the band-pass filter. As a result, it is possible to evaluate and determine the unbalance of the rotor of the turbocharger (for example, the unbalance due to scale adhesion), the bending of the rotor, the contact between the rotor and the casing, etc., and it is possible to propose the optimum maintenance of the turbocharger and prevent failures, and the like.

[6] In some embodiments, in the above configuration [5], $0.8C \leq Fc \leq 1.2C$ is satisfied, where Fe is the center frequency, and C is the rotation speed of the rotational shaft.

With the above configuration [6], since the center frequency of the passband of the band-pass filter is set to match or substantially match the rotation speed of the rotational shaft ($0.8C \leq Fc \leq 1.2C$), the vibration synchronized with the rotation of the rotational shaft can be evaluated precisely based on the vibration signal extracted by the band-pass filter. As a result, it is possible to evaluate and determine the unbalance of the rotor of the turbocharger, the bending of the rotor, the contact between the rotor and the casing, etc., and it is possible to propose the optimum maintenance of the turbocharger and prevent failures, and the like.

[7] In some embodiments, in the above configuration [5] or [6], the vibration monitoring device further includes a display part (34) for displaying an amplitude of the vibration signal and a phase angle of the vibration signal with respect to the rotation signal, based on the rotation signal and the vibration signal extracted by the band-pass filter.

With the above configuration [7], by detecting the amplitude and phase of the vibration synchronized with the rotation of the rotational shaft (vibration with a frequency one times the rotation speed C) and displaying them on the display part, the vibration synchronized with the rotation of the rotational shaft can be evaluated precisely, and for example, the critical speed of the shaft system of the turbocharger, the contact event, and the unbalance as described above can be determined precisely.

[8] In some embodiments, in any one of the above configurations [1] to [7], the filter command value is a current value or a voltage value obtained by converting the rotation speed of the rotational shaft calculated from the rotation signal.

In many cases, the first low-pass filter can set the first cutoff frequency according to a current value or voltage value. With the above configuration [8], since the filter command value is a current value or voltage value, the first cutoff frequency can be freely set in accordance with the rotation speed. Moreover, since the first low-pass filter as described above is generally available on the market at a low cost, an increase in the cost can be suppressed.

[9] In some embodiments, in any one of the above configurations [1] to [8], the rotational shaft includes a marker portion (108) configured such that the rotation signal has a pulse waveform.

With the above configuration [9], since the rotational shaft includes the marker portion, the rotation sensor can output the rotation signal with higher precision than when the rotation signal is output from the rotational shaft that does not include the marker portion.

[10] In some embodiments, in the above configuration [9], the marker portion includes at least two or more grooves (118) formed on an outer peripheral surface (116) of the rotational shaft. The rotation sensor is an eddy current displacement sensor for detecting a distance (d) to the outer peripheral surface of the rotational shaft by generating an eddy current on the outer peripheral surface of the rotational shaft.

With the above configuration [10], the rotation sensor can be an eddy current sensor. Further, since at least two grooves are formed on the outer peripheral surface of the rotational shaft, the rotation sensor outputs the rotation signal having two pulses during one rotation of the rotational shaft. Thus, the vibration signal can be extracted with higher precision than when the rotation signal having one pulse during one rotation of the rotational shaft is output.

[11] In some embodiments, in the above configuration [9], the marker portion includes at least two or more grooves formed on an outer peripheral surface of the rotational shaft. The rotation sensor is a laser displacement sensor for detecting a distance to the outer peripheral surface of the rotational shaft by reflected light of a laser beam by irradiating the outer peripheral surface of the rotational shaft with the laser beam.

With the above configuration [11], the rotation sensor can be a laser displacement sensor.

[12] A turbocharger (100) according to the present disclosure includes: the vibration monitoring device described in any one of [1] to [11]; a compressor (104) disposed on one end portion of the rotational shaft; and a turbine (106) disposed on another end portion of the rotational shaft.

During operation of the turbocharger, the rotation speed of the rotational shaft provided in the turbocharger often fluctuates. With the above configuration [12], the first low-pass filter of the vibration monitoring device has the first cutoff frequency set in accordance with the rotation speed of the rotational shaft. Therefore, when the turbocharger is equipped with the vibration monitoring device, it is possible to provide the turbocharger that can evaluate the vibration of the rotational shaft of the turbocharger from the rotation signal of the rotational shaft of the turbocharger.

[13] In some embodiments, in the above configuration [12], the turbocharger further includes: an acceleration sensor for detecting vibration of an engine; and a display part (44) for simultaneously displaying vibration information of the engine obtained from output of the acceleration sensor and vibration information of the rotational shaft obtained from the vibration signal extracted by the at least one filter.

With the above configuration [13], the acceleration sensor can indirectly obtain vibration information of the engine, and by simultaneously displaying the vibration information of the engine and the vibration information of the rotational shaft of the turbocharger on the display part, vibration of the rotational shaft of the turbocharger and vibration of the engine can be evaluated without confusion. Thus, it is possible to precisely evaluate and determine vibration of the rotational shaft of the turbocharger. Further, for example, when a MEMS sensor is used as the acceleration sensor, since the MEMS sensor is inexpensive, it is possible to evaluate the vibration of the rotational shaft of the turbocharger inexpensively and precisely.

[14] In some embodiments, in the above configuration [12] or [13], the turbocharger includes: a bearing (50) rotatably supporting the rotational shaft; a bearing temperature sensor (52) for detecting a temperature of the bearing; a lubricant oil outlet temperature sensor (54) for detecting a temperature of lubricant oil outlet in the turbocharger; and a display part (44) for simultaneously displaying the temperature of the bearing detected by the bearing temperature sensor, the temperature of the lubricant oil outlet detected by the lubricant oil outlet temperature sensor, and vibration information of the rotational shaft obtained from the vibration signal extracted by the at least one filter.

With the above configuration [14], the condition of the turbocharger can be evaluated precisely from the temperature information of the bearing and the temperature information of the lubricant oil outlet in the turbocharger, leading to improved evaluation precision for preventive maintenance of the turbocharger.

[15] A vibration monitoring method according to the present disclosure includes: a step (S2) of outputting a rotation signal synchronized with rotation of a rotational shaft; a step (S4) of outputting a filter command value corresponding to a rotation speed of the rotational shaft calculated from the rotation signal; and a step (S6) of extracting, in response to input of the rotation signal and the filter command value, a signal in a passband set according to the filter command value from the rotation signal as a vibration signal from which vibration information of the rotational shaft can be obtained.

With the above method [15], by setting the passband of the at least one filter in accordance with the rotation speed of the rotational shaft appropriately, a signal in the passband suitable for evaluating the vibration of the rotational shaft can be extracted from the rotation signal synchronized with the rotation of the rotational shaft. Thus, it is possible to evaluate the vibration of the rotational shaft from the rotation signal of the rotational shaft.

REFERENCE SIGNS LIST

1 Vibration monitoring device
2 Rotation sensor
4 Output device
6 First low-pass filter
10 Second low-pass filter
20 Band-pass filter
30 Vector monitor
32 Detection part
34, 44, 126 Display part
40 Sensor
42 Housing
50 Bearing
52 Bearing temperature sensor
54 Lubricant oil outlet temperature sensor
100 Turbocharger
102 Rotational shaft
104 Compressor
106 Turbine
108 Marker portion
116 Outer peripheral surface of rotational shaft
118 Groove
130 Pulse
A Rotation signal
C Rotation speed
D Filter command value
E Vibration signal
F Lifting signal
G Vibration signal
d Distance
S2 Rotation signal output step
S4 Filter command value output step
S6 Extraction step

The invention claimed is:

1. A vibration monitoring device, comprising:
a rotation sensor for outputting a rotation signal synchronized with rotation of a rotational shaft;
an output device for outputting a filter command value that changes in accordance with changes in corresponding to a rotation speed of the rotational shaft calculated from the rotation signal; and
at least one filter for extracting, in response to input of the rotation signal and the filter command value, a signal in a passband set according to the filter command value from the rotation signal as a vibration signal from which vibration information of the rotational shaft can be obtained.

2. The vibration monitoring device according to claim 1, wherein the at least one filter includes a first low-pass filter, and
wherein the first low-pass filter extracts, in response to input of the rotation signal and the filter command value, a signal in a passband lower than a first cutoff frequency set according to the filter command value as the vibration signal.

3. The vibration monitoring device according to claim 2, wherein the at least one filter further includes a second low-pass filter having a second cutoff frequency lower than the first cutoff frequency.

4. The vibration monitoring device according to claim 3, wherein the second low-pass filter extracts, in response to input of the vibration signal extracted by the first low-pass filter, a signal in a passband lower than the second cutoff frequency from the vibration signal as a lifting signal from which lifting information of the rotational shaft can be obtained.

5. The vibration monitoring device according to claim 1, wherein the at least one filter includes a band-pass filter, and
wherein the band-pass filter extracts, in response to input of the rotation signal and the filter command value, a signal in a passband including a center frequency set according to the filter command value from the rotation signal as the vibration signal.

6. The vibration monitoring device according to claim 5, wherein $0.8C \leq Fc \leq 1.2C$ is satisfied, where Fc is the center frequency, and C is the rotation speed of the rotational shaft.

7. The vibration monitoring device according to claim 5, further comprising a display part for displaying an amplitude of the vibration signal and a phase angle of the vibration signal with respect to the rotation signal, based on the rotation signal and the vibration signal extracted by the band-pass filter.

8. The vibration monitoring device according to claim 1, wherein the filter command value is a current value or a voltage value obtained by converting the rotation speed of the rotational shaft calculated from the rotation signal.

9. The vibration monitoring device according to claim 1, wherein the rotational shaft includes a marker portion configured such that the rotation signal has a pulse waveform.

10. The vibration monitoring device according to claim 9, wherein the marker portion includes at least two or more grooves formed on an outer peripheral surface of the rotational shaft, and
wherein the rotation sensor is an eddy current displacement sensor for detecting a distance to the outer peripheral surface of the rotational shaft by generating an eddy current on the outer peripheral surface of the rotational shaft.

11. The vibration monitoring device according to claim 9, wherein the marker portion includes at least two or more grooves formed on an outer peripheral surface of the rotational shaft, and wherein the rotation sensor is a laser displacement sensor for detecting a distance to the outer peripheral surface of the rotational shaft by reflected light of a laser beam by irradiating the outer peripheral surface of the rotational shaft with the laser beam.

12. A turbocharger, comprising:

the vibration monitoring device according to claim 1;

a compressor disposed on one end portion of the rotational shaft; and a turbine disposed on another end portion of the rotational shaft.

13. The turbocharger according to claim 12, further comprising:

an acceleration sensor for detecting vibration of an engine; and a display part for simultaneously displaying vibration information of the engine obtained from output of the acceleration sensor and vibration information of the rotational shaft obtained from the vibration signal extracted by the at least one filter.

14. The turbocharger according to claim 12, comprising:

a bearing rotatably supporting the rotational shaft;

a bearing temperature sensor for detecting a temperature of the bearing;

a lubricant oil outlet temperature sensor for detecting a temperature of lubricant oil outlet in the turbocharger; and a display part for simultaneously displaying the temperature of the bearing detected by the bearing temperature sensor, the temperature of the lubricant oil outlet detected by the lubricant oil outlet temperature sensor, and vibration information of the rotational shaft obtained from the vibration signal extracted by the at least one filter.

15. A vibration monitoring method, comprising:

a step of outputting a rotation signal synchronized with rotation of a rotational shaft;

a step of outputting a filter command value that changes in accordance with changes in corresponding to a rotation speed of the rotational shaft calculated from the rotation signal; and a step of extracting, in response to input of the rotation signal and the filter command value, a signal in a passband set according to the filter command value from the rotation signal as a vibration signal from which vibration information of the rotational shaft can be obtained.

16. A vibration monitoring device, comprising:

a rotation sensor for outputting a rotation signal synchronized with rotation of a rotational shaft;

an output device for outputting a filter command value corresponding to a rotation speed of the rotational shaft calculated from the rotation signal; and at least one filter for extracting, in response to input of the rotation signal and the filter command value, a signal in a passband set according to the filter command value from the rotation signal as a vibration signal from which vibration information of the rotational shaft can be obtained, wherein the filter command value is a current value or a voltage value obtained by converting the rotation speed of the rotational shaft calculated from the rotation signal.

* * * * *